United States Patent
Day

(10) Patent No.: US 6,220,172 B1
(45) Date of Patent: Apr. 24, 2001

(54) CAMERA TRACK SYSTEM AND CONTROLS THEREFOR

(75) Inventor: Robin Day, Walton on Thames (GB)

(73) Assignee: Aerial Camera Systems, Ltd. (GB)

( * ) Notice: Subject to any disclaimer, the term of this patent is extended or adjusted under 35 U.S.C. 154(b) by 0 days.

(21) Appl. No.: 09/138,164

(22) Filed: Aug. 21, 1998

(30) Foreign Application Priority Data

Aug. 22, 1997 (GB) .................................................. 9717833

(51) Int. Cl.⁷ .................................................. B61B 10/02
(52) U.S. Cl. .................... 104/118; 104/295; 104/296; 105/141; 105/144; 105/91
(58) Field of Search .................... 104/118, 119, 104/295, 296, 300; 105/141, 144, 91, 92; 352/243; 396/419, 428, 429; 191/12 R, 12.2 R, 12.4 R

(56) References Cited

U.S. PATENT DOCUMENTS

| | | | |
|---|---|---|---|
| 3,613,546 | * 10/1971 | Richardson | 95/86 |
| 4,473,291 | 9/1984 | Wally, Jr. | |
| 4,943,821 | * 7/1990 | Gelphman et al. | 354/99 |
| 5,018,009 | * 5/1991 | Koerv | 358/100 |
| 5,113,768 | * 5/1992 | Brown | 104/112 |
| 5,178,247 | * 1/1993 | Vagaggini | 191/12 |

FOREIGN PATENT DOCUMENTS

| | | |
|---|---|---|
| 296 06 317 U | 6/1996 | (DE) . |
| 0 705 665 | 4/1996 | (EP) . |
| 2 582 437 | 11/1986 | (FR) . |
| 2 265 591 | 10/1993 | (GB) . |

\* cited by examiner

*Primary Examiner*—S. Joseph Morano
*Assistant Examiner*—Frantz Jules
(74) *Attorney, Agent, or Firm*—Cook, Alex, McFarron, Manzo, Cummings & Mehler, Ltd.

(57) ABSTRACT

A camera track system comprising a track (100), a camera mounted on a movable truck (102) driven by drive means (104), control means (110) for controlling movement of the truck (102) along the track (100), in which commands between the control means (110) and the truck (102) are effected by means of a flexible link (136) contained within the track (100), allowing remote control of the truck (102). The control means (110) may comprise separate controls for the camera, operated by the hands of the operator, and for the truck, operated by the feet of the operator.

22 Claims, 10 Drawing Sheets

FIG. 9
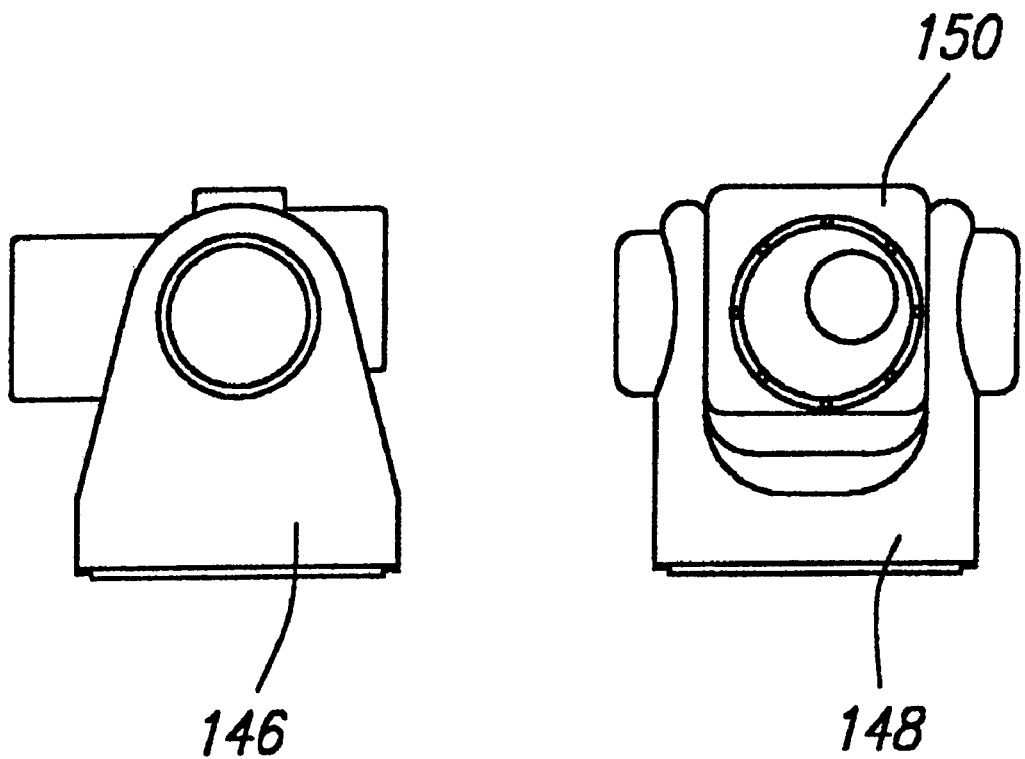
146  148
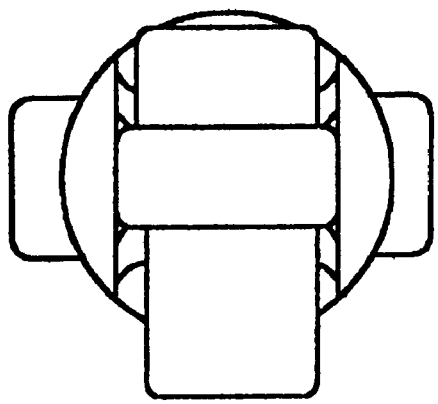

CAMERA TRACK SYSTEM AND CONTROLS THEREFOR

The present invention relates to an camera track system and controls therefor.

Previously such systems have used tracks to enable the movement of a camera along a fixed path for filming of motion pictures or sporting evens. Such systems have normally involved a camera mounted on a track which is moved by a truck operator whilst the camera is controlled by a cameraman. In previously proposed track camera systems the component to carry cameras and command feeds (wiring) have been placed around an open fabricated truss creating a large component which is often easily visible. Such systems have disadvantages due to their size which limits events which they can film and also due to the two-man operation of the system that it is not possible to take pictures of fast changing events such sporting events.

It is a first aim of the present invention to provide a compact track system to overcome size problems.

Accordingly, a first aspect of the present invention is directed to a camera track system comprising a camera mounted on a movable truck, track components which releasably join together to form a complete track, drive means which move the camera truck along the track, control means by which the camera and truck are controlled, in which commands between the control means and the camera truck are effected by means of a flexible link contained in the track.

Preferably the flexible link is a chain link surrounding power and command cables.

Advantageously the flexible link is contained in a boxed structure within the rack which has a slot to allow connection to the camera truck.

In a preferred embodiment inside of the boxed structure is provided with friction reducing materials.

Preferably the flexible link can be doubled back on itself to enable easy paying in and paying out of it within the boxed structure.

This provides the advantage that the track system is considerably more compact with the result that the camera can be mounted considerably close to the ground therefore not interfering with the view of spectators at a sporting event such as a football game. Furthermore, the system is light and portable and can easily be taken apart and put together again. The system due to the link contained in the track enables the system to work equally well in horizontal or vertical planes or when the camera truck is suspended.

It is a second aim of the present invention to enable a camera track system to be controlled from a long distance away.

Accordingly a second aspect of the present invention is directed to a camera track system comprising a camera mounted on a movable truck, a track, control means for controlling the truck and the camera in which commands are communicated between the control means and the camera track system by means of a RS 422 data link.

This provides the advantage that the camera system can be controlled by the operator a considerable distance away in some cases up to 16 kilometers away.

It is a third aim of the present invention to enable a camera track system to be controlled by a single person.

Accordingly a third aspect of the present invention is directed to a control apparatus for a camera track system, in which a camera is movable mounted on a truck which is movable backwards and forwards along the track, comprising means to control the movement of the camera itself operable by hand and means to control the movement of the truck operable by foot.

Preferably the means to control the movement of the truck comprise two pedals, one to move the truck to the left and one to move the truck to the right.

Advantageously the amount of depression of each pedal determines the speed of movement of the truck.

In a preferred embodiment the means for controlling the camera is a joystick system.

Preferably the control system has a number of selectors which upon use move the truck to a predetermined position on the track.

This provides the advantage of a moving camera perspective with pictures framed by a single camera person, an ideal perspective when that person is provided a view of for instance, moving play during a football match, where instant reaction to moves can be effected almost as a reaction, rather than by communication to a second operator who in turn would cause the camera truck to move.

An example of a camera system made in accordance with the present invention is described herein below with reference to the accompanying drawings in which:

BRIEF DESCRIPTION OF THE DRAWINGS

FIG. 9 shows views of the camera mounting for the camera for the system; and

DETAILED DESCRIPTION OF THE INVENTION

Figure 1:
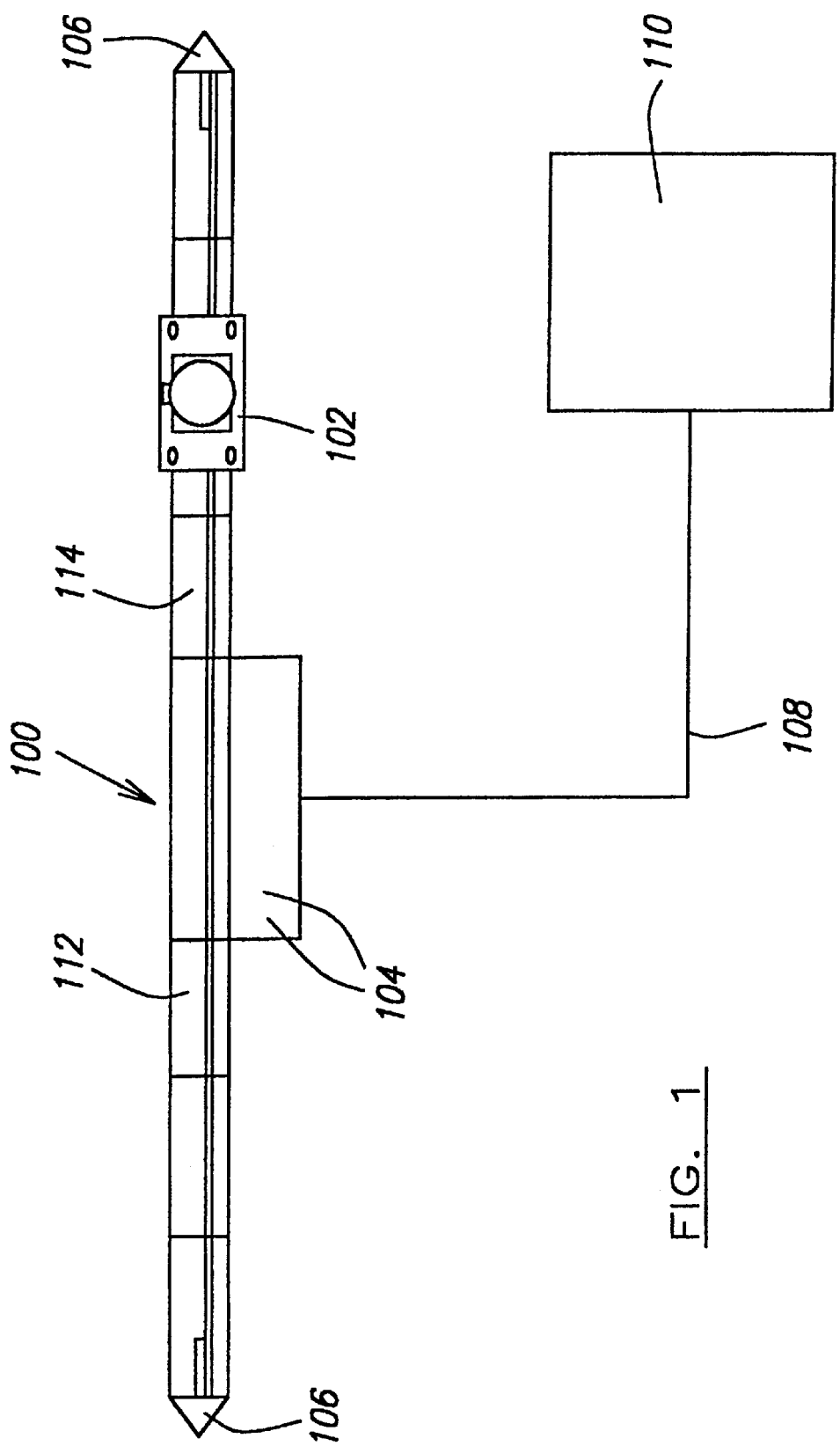
FIG. 1 shows a schematic drawing of such a system from above.

FIG. 1 shows a schematic drawing of the camera track system. The camera track system is provided with a track 100. On the track 100 is mounted a movable camera truck 102. Next to the track 100 in the center is provided a drive unit 104 which contains the servo motors to move the truck 102 backwards and forwards. At either end of the track 100 there are buffers 106 which are made in a known fashion. The truck 102 moves backwards and forwards along the track 100 and is stopped at either end by the buffers 106. The drive unit 104 is linked by RS 422 data link 108 to a remote control unit 110 which is operated by a single camera person. The track 100, on either side of the drive unit 104 which has a separate unit of track attached to it, is composed of individual units, units 112 on one side of the drive unit and 114 on the other side. The number of track units 112 and 114 can be varied depending upon the length of coverage required.

Figure 2:
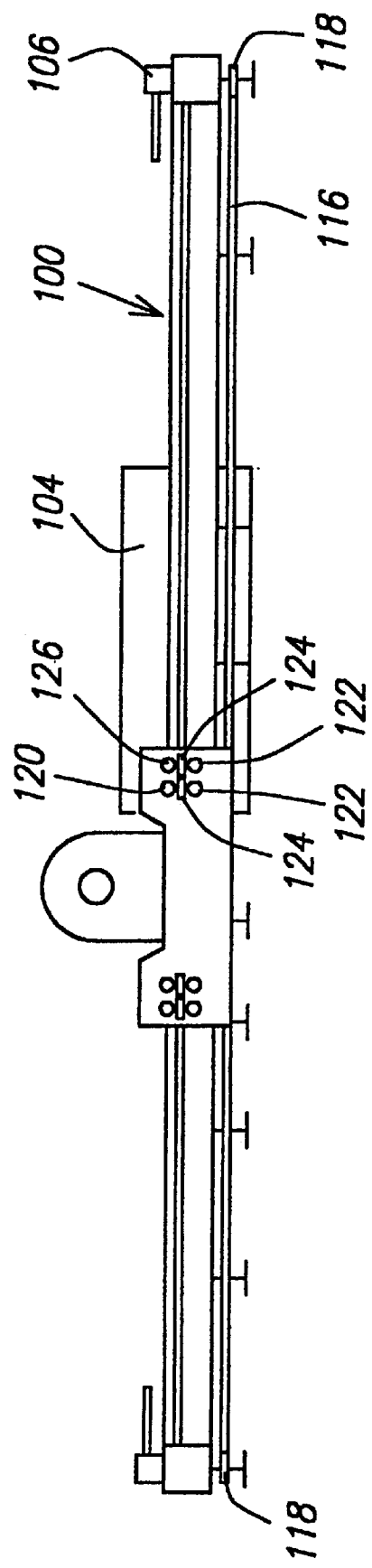
FIG. 2 shows a side schematic drawing of a system shown in FIG. 1.

FIG. 2 shows a side view of the camera track system. The camera truck 102 is moved along the track 100 by an endless toothed belt 116. The toothed belt 116 runs round two pulleys 118 mounted underneath each buffer 106. The toothed belt 116 is moved backwards and forwards by a pulley arrangement in a drive unit 104. The camera truck 102 runs on a track 100 using wheels 120. The truck 102 is held on the track by lower wheels 122 which restrict its vertical movement. Lateral movement of the truck 102 is restricted by wheels 124 mounted sideways to run on the side of the track 100.

Figure 3:
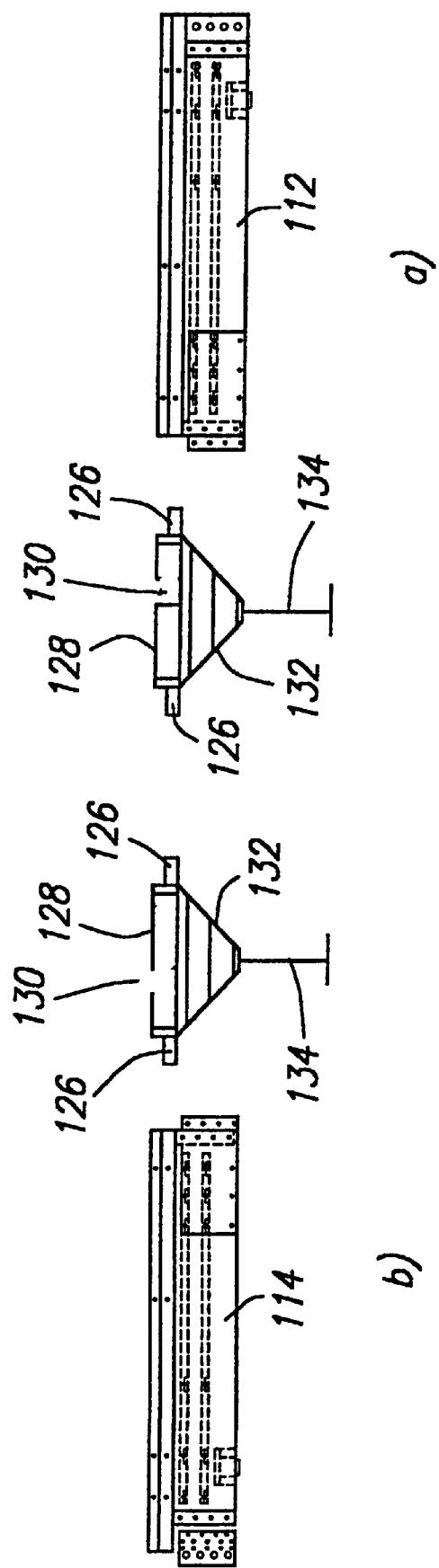
FIG. 3 shows side and sectional views of track elements.

FIG. 3a shows a side view and a cross sectional of the track unit 112 and FIG. 3b shows a side view and a cross sectional view of the track unit 114. Both track units 112 and 114 have two rail members 126 on either side of the track unit upon which the wheels 120, 122 and 124 of the camera truck 102 run. Between the rail members 126 there is a box structure 128 in both cases. The box structure 128 has a slot 130 in its top surface. Underneath the box structure 128 there is a triangular base compartment 132 at the apex of which are fitted feet 134 upon which the track 100 stands. Inside the box structure 128 in the case of track unit 112 there is a walling around the slot 130 so that half of the box structure 128 is walled off. The track unit 114 however does not have the wall and the whole of the box structure 128 is open inside. The inside of the box structure 128 is designed to hold a control cable 136 for the truck unit 102. Therefore the exposed inside walls of the box structure 128 are coated with material to reduce friction between the control cable 136 and the inside of the box structure 128.

Figure 4:
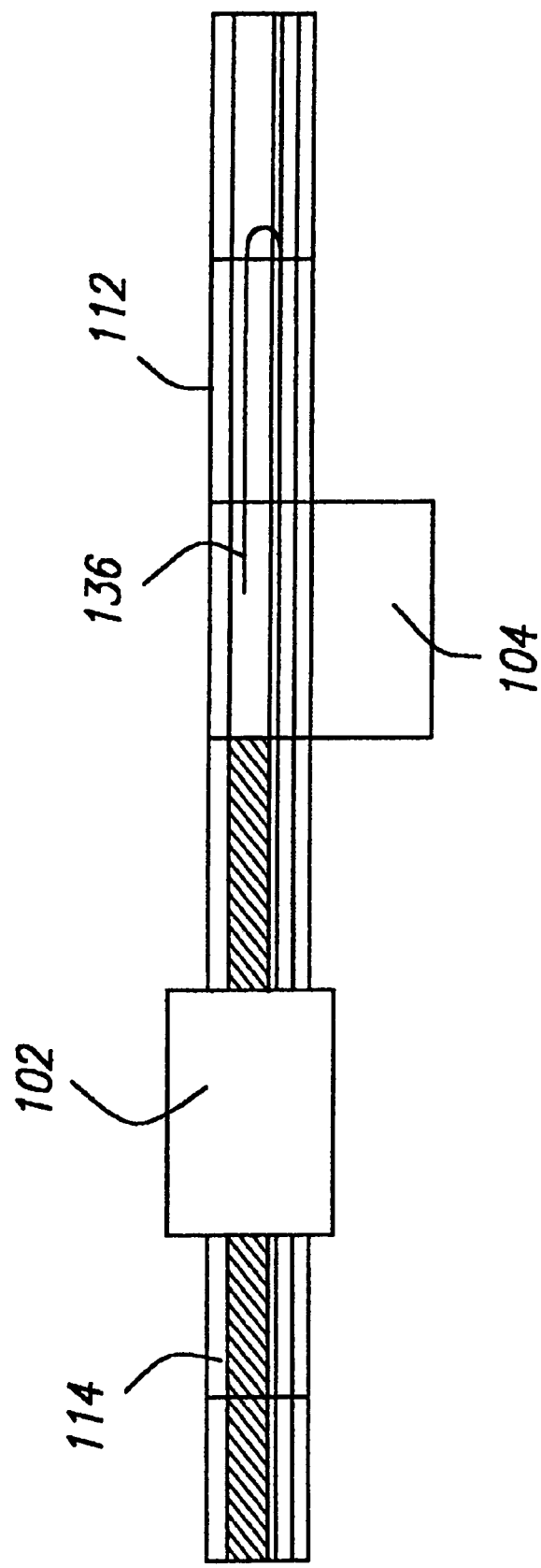
FIG. 4 shows a schematic plan view of the track and control cable.

FIG. 4 shows a schematic drawing of the box structure 128 along the whole length of the track. The area 138 shown in cross hatching corresponds to the boxed in part of the box structure in track units 114. The camera truck 102 is connected for control purposes to the drive unit 104 by the control cable 136 which runs inside the box structure 128. The control cable 136 comprises a segmented carrier in which the power and control cables are held. The segmented nature of the control cable 136 allows it to bend and be moved around easily and to be extended or reduced in length as desired. As can be seen from FIG. 4 the control cable 136 is attached at one end to the center unit of the track 100 next to the drive unit 104. At its other end it is attached to the camera truck 102. The control cable 136 proceeds to the right of FIG. 4 and then curves round and proceeds back to the camera truck 102. This means that as the truck 102 moves to either the left or right on FIG. 4 the control cable is either paid out from the loop or doubled back on itself. This means that the control cable 136 can reach either end of the track easily. This is why the track units 112 on the right hand side of FIG. 4 have a open box structure 128 to enable the doubling up of the control cable 136 whereas the track units 114 on the left hand of FIG. 4 only contain a slot as they only have to contain one width of the control cable without the need for it double back on itself.

Figure 5:
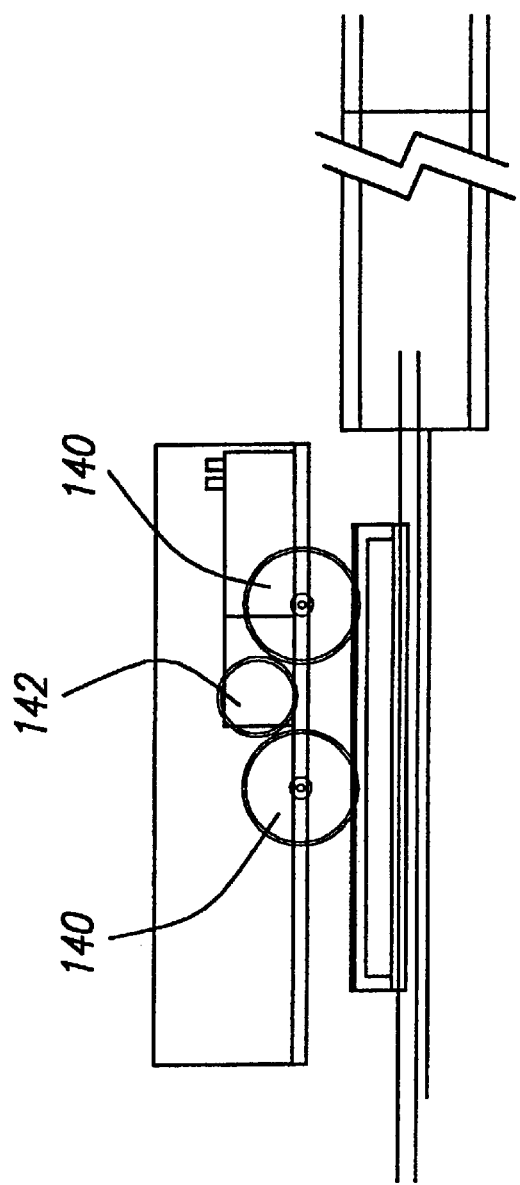
FIG. 5 shows a plan view of the pulley drive for the track system.

In FIG. 5 shows the drive system used by the drive unit to move the toothed belt 116 comprising two guide pulleys 140 and a drive pulley 142 whereby the toothed belt 116 is fed by the guide pulleys 142 round the outside of the drive pulley 142.

Figure 6:
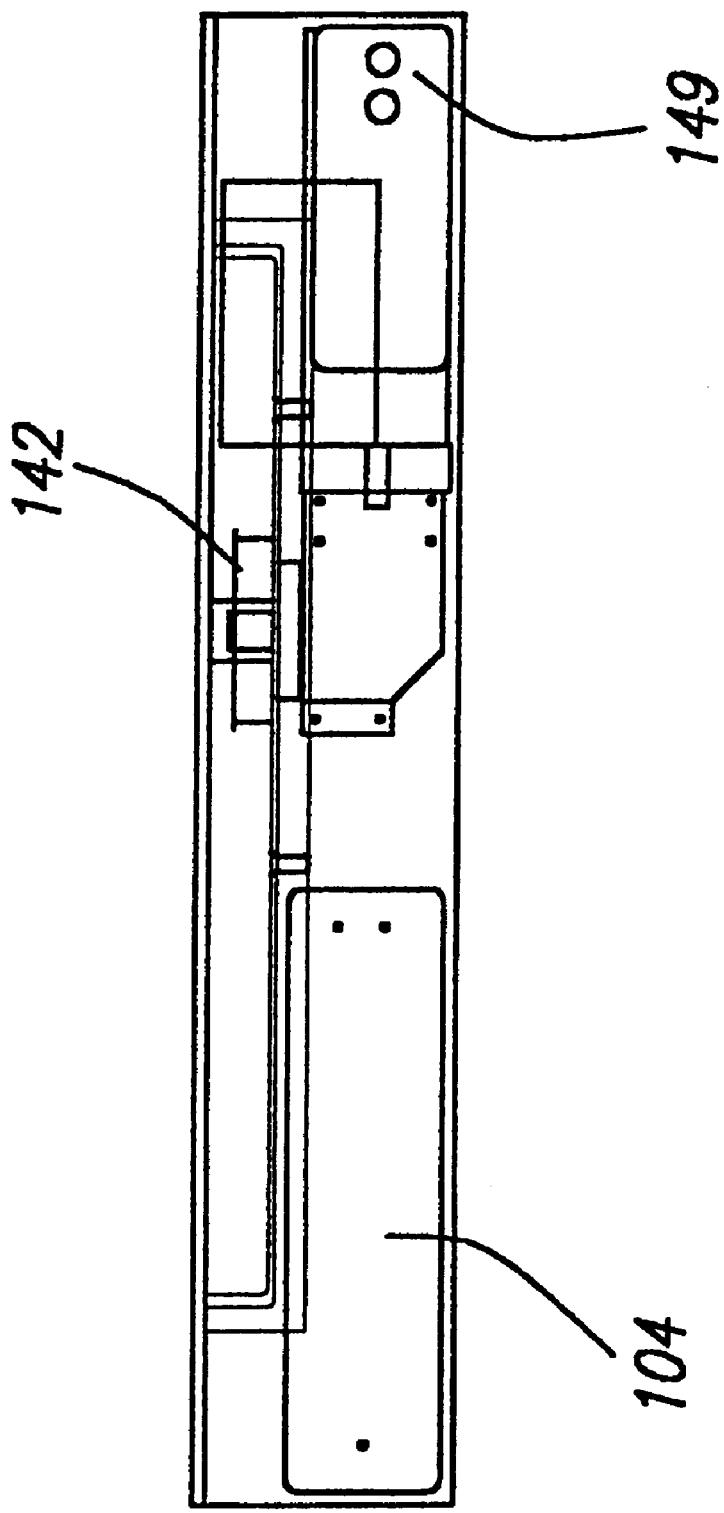
FIG. 6 shows a side view of the pulley drive of FIG. 4.

FIG. 6 shows a side view of the drive pulley 142 in the drive unit 104 showing external cable linkages 144 whereby a power and control signals are supplied to the unit 104.

Figure 7:
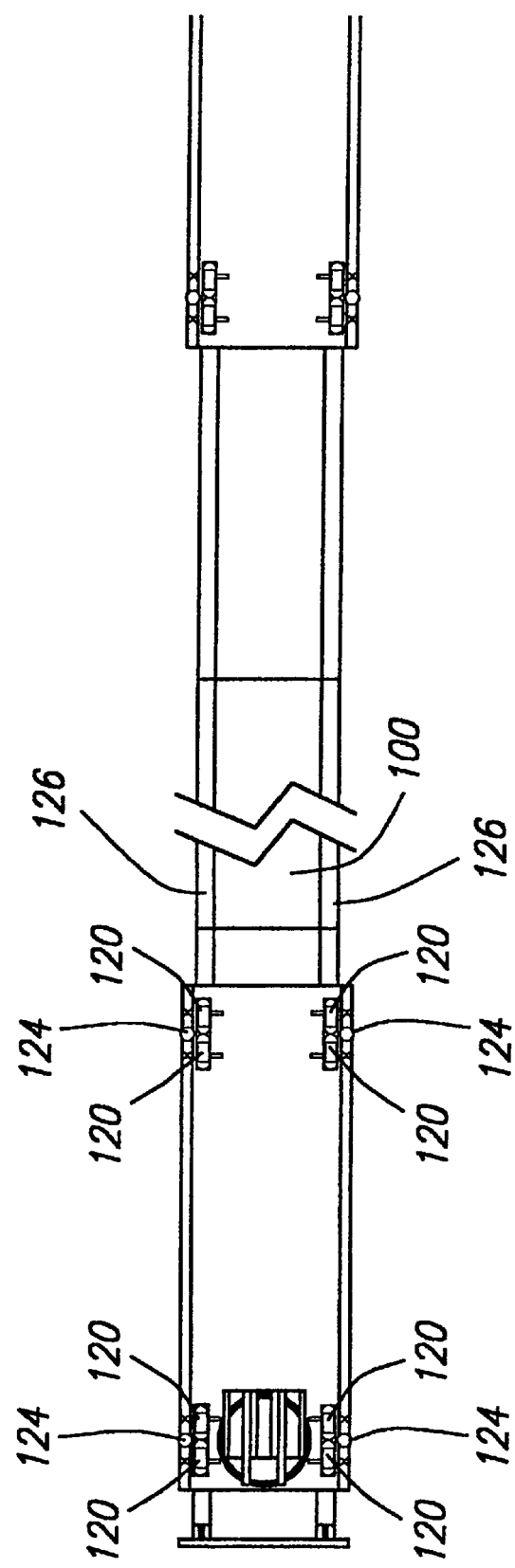
FIG. 7 shows a top schematic view of the camera truck.

FIG. 7 shows a top schematic view of the truck 102. Two pairs of wheels 120 can easily be seen running on each rail element 126 of the track 100. The side wheels 124 are also clearly visible.

Figure 8:
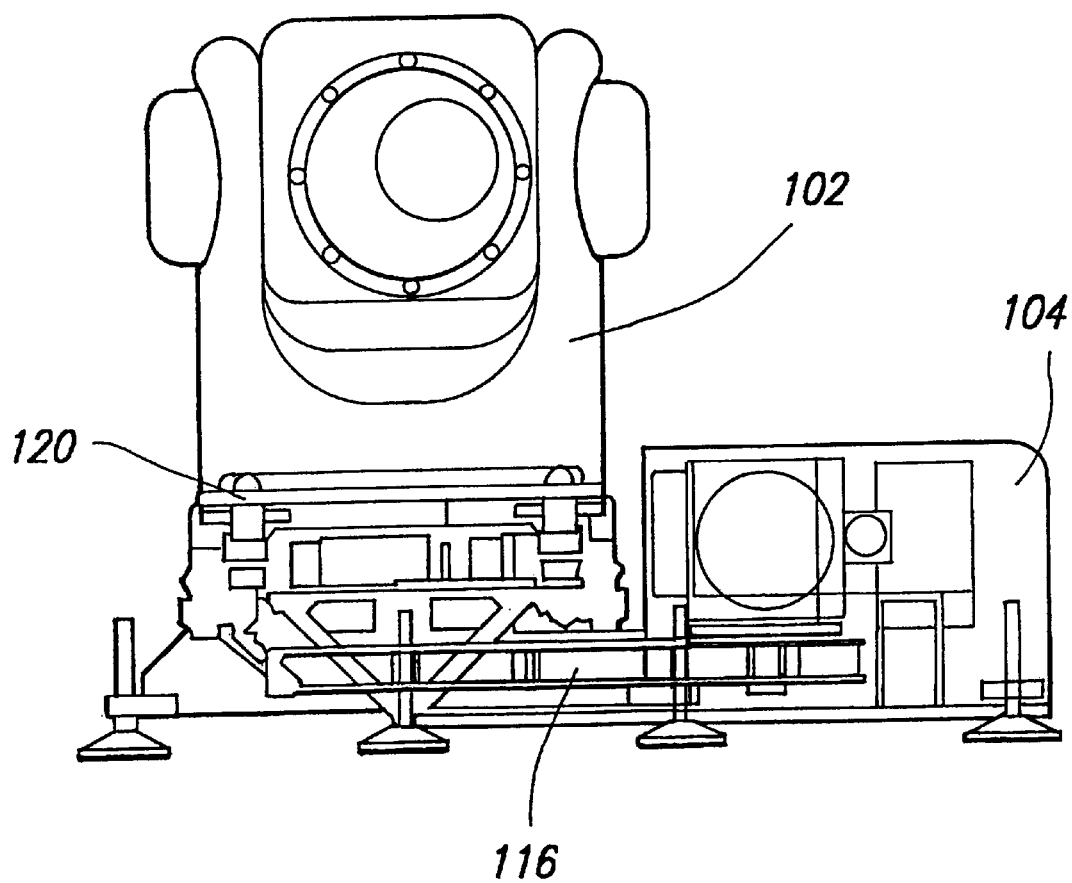
FIG. 8 shows a cross sectional view of the camera truck next to the drive unit.

FIG. 8 shows a side sectional view of the camera truck 102 next to the drive unit 104. The sets of wheels 120 and 122 above and below the rail element 126 are clearly visible. The connection between the underside of the camera truck 102 and the endless toothed belt 116 which runs underneath the track can be seen clearly.

FIG. 9 shows side front and top views of the camera 146 for the camera truck 102. The camera is mounted in a U-shaped base 148 which is rotationally movable left and right. The camera itself is held in the middle of the U in a unit which is rotationally movable up and down.

Figure 10:
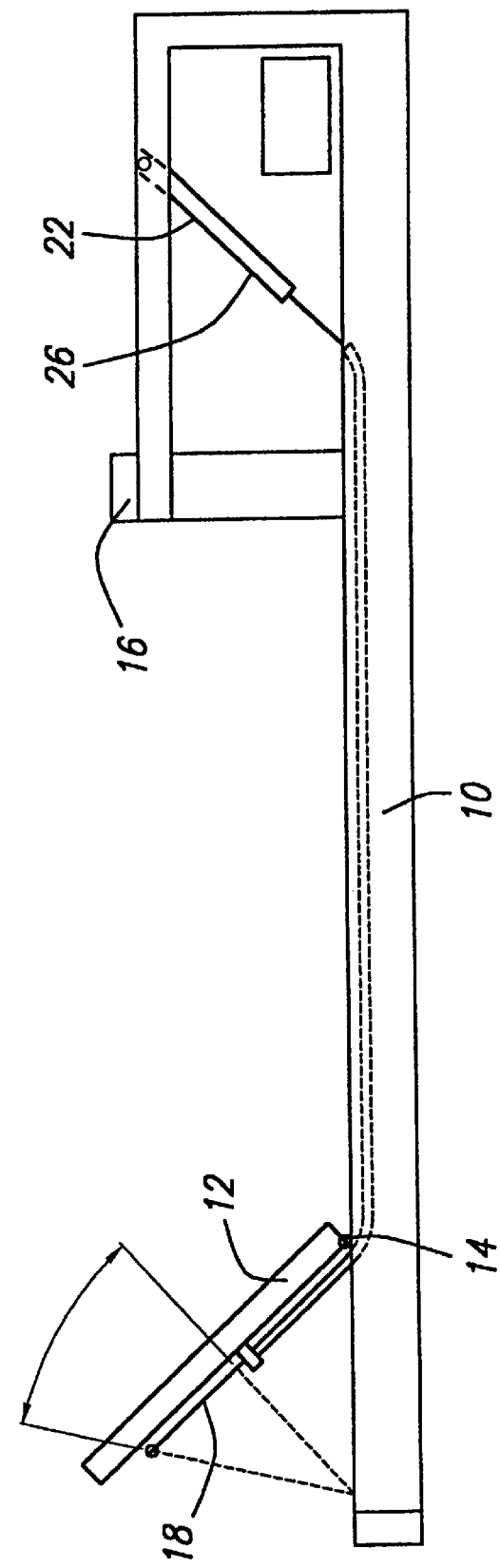
FIG. 10 is a side view of the control apparatus for such a camera system.

In FIG. 10 a base 10 is provided upon which a pair of pedals 12 are pivotably mounted by pivots 14. The base 10 also possesses a mounting point 16 for the fitting of a chair for the operator to sit on. Attached to the pedals 12 are push pull control cables 18. The push pull control cables 18 are attached underneath the seat at point 20 to linear variable differential transformers 22.

The depression of the left-hand pedal 12 moves the camera truck to the left and depression of the right-hand pedal moves the camera truck to the right. The pedals provide a displacement signal to the servo drive computer of the servo drive motor for the camera truck indicating in which direction the camera truck is to move. The more each pedal is depressed the faster the truck moves. This is accomplished by the push pull cable providing a scale signal produced by the linear variable differential transformer 22. The linear variable differential transformer 22 provides a precise command which gives a scale signal to the servo drive computer of the servo drive motor for the camera truck.

The control position is connected via an RS 422 data link to the camera track system which enables the operation of the camera to be controlled from a distance of up to 16 kilometers.

What is claimed is:

1. A camera track system comprising a camera mounted on a movable truck, track components which releasably join together to form a complete track, the track having a boxed structure, and the boxed structure having a slot, drive means which move the camera truck along the track, control means by which the camera and truck are controlled, in which commands between the control means and the camera truck are effected by means of a flexible link contained within the boxed structure, the flexible link passing through the slot to connect with the camera truck.

2. A camera track system according to claim 1, in which the flexible link is a segmented carrier surrounding power and command cables.

3. A camera track system according to claim 2, in which the inside of the boxed structure is provided with friction reducing materials.

4. A camera track system according to claim 3, in which the flexible link can be doubled back on itself to enable easy paying in and paying out of it within the boxed structure.

5. A camera track system according to claim 2, in which the flexible link can be doubled back on itself to enable easy paying in and paying out of it within the boxed structure.

6. A camera track system according to claim 1, in which the inside of the boxed structure is provided with friction reducing materials.

7. A camera track system according to claim 1, in which the flexible link can be doubled back on itself to enable easy paying in and paying out of it within the boxed structure.

8. A camera track system according to claim 1, in which the flexible link can be doubled back on itself to enable easy paying in and paying out of it within the boxed structure.

9. A camera track system according to claim 1 in which commands are communicated between the control means and the rest of the camera track system by means of a RS 422 data link.

10. A control apparatus for a camera track system, in which a camera is movably mounted on a truck which is movable backwards and forwards along the track, comprising means to control the movement of the camera itself operable by hand and means to control the movement of the truck operable by foot.

11. A control apparatus for a camera track system according to claim 10, in which the means to control the movement of the truck comprise two pedals, one to move the truck to the left and one to move the truck to the right.

12. A control apparatus for a camera track system according to claim 11, in which the amount of depression of each pedal determines the speed of movement of the truck.

13. A control apparatus for a camera track system according to claim 12, in which the means for controlling the camera is a joystick system.

14. A control apparatus for a camera track system according to claim 13, in which the control apparatus has a number of selectors which upon use move the truck to a predetermined position on the track.

15. A control apparatus for a camera track system according to claim 11, in which the means for controlling the camera is a joystick system.

16. A control apparatus for a camera track system according to claim 15, in which the control apparatus has a number of selectors which upon use move the truck to a predetermined position on the track.

17. A control apparatus for a camera track system according to claim 11, in which the control apparatus has a number of selectors which upon use move the truck to a predetermined position on the track.

18. A control apparatus for a camera track system according to claim 11 in which the control system has a number of selectors which upon use move the truck to a predetermined position on the track.

19. A control apparatus for a camera track system according to claim 10, in which the means for controlling the camera is a joystick system.

20. A control apparatus for a camera track system according to claim 19, in which the control apparatus has a number of selectors which upon use move the truck to a predetermined position on the track.

21. A control apparatus for a camera track system according to claim 10 in which the control apparatus has a number of selectors which upon use move the truck to a predetermined position on the track.

22. A control apparatus for a camera track system according to claim 21, in which the control apparatus has a number of selectors which upon use move the truck to a predetermined position on the track.

* * * * *